United States Patent [19]

Burgess

[11] 4,440,091
[45] Apr. 3, 1984

[54] GUIDEWAY CONTROL APPARATUS

[76] Inventor: John A. Burgess, 232 S. Chancellor St., Newtown, Pa. 18940

[21] Appl. No.: 405,787

[22] Filed: Aug. 6, 1982

[51] Int. Cl.³ .................. A01B 69/00; B61B 12/02; G05D 1/00
[52] U.S. Cl. .................................. 104/139; 56/10.2; 56/DIG. 15; 104/244.1; 180/79.3; 180/131; 242/86.5 R
[58] Field of Search .............. 180/79, 131, 135, 139, 180/141, 143, 144, 79.1, 79.3; 280/87.2; 56/10.1, 10.2, 16.7, DIG. 15; 238/2, 4; 242/85, 94, 86.5, 86.51; 104/245, 246, 247, 244.1, 139, 140, 60, 61, 242; 239/189, 188; 172/23, 26

[56] References Cited
U.S. PATENT DOCUMENTS 3,273,664  9/1966  Ramer ................................ 180/79

FOREIGN PATENT DOCUMENTS 20606  7/1905  Austria ................................ 172/23
599757  4/1978  U.S.S.R. ............................. 180/131

Primary Examiner—Joseph F. Peters, Jr.
Assistant Examiner—Mitchell J. Hill
Attorney, Agent, or Firm—John J. Simkanich

[57] ABSTRACT

An apparatus for automatically controlling the operation of a non-track machine, such as a tractor used in plowing, fertilizing or mowing, may incorporate a guideway which limits the repetitive closed loop elongate path through which such a slave tractor operates to, electively, increasing or decreasing diametric distances, whereof a trolley, captive to the guideway, electively, pays out or takes in a control tether cable controlling the steering operation of the slave tractor.

10 Claims, 7 Drawing Figures

GUIDEWAY CONTROL APPARATUS

BACKGROUND OF THE INVENTION

This invention relates to controllers for garden, farm and other field machinery and specifically to tethering and steering apparatus for such machinery.

Various types equipment have been designed through the years for controlling the operation of self-propelled power equipment used in large open expanses where repetitive passes are needed and no obstacles are present to be steered around.

Haupt, U.S. Pat. No. 3,627,071, describes a tethering device for self-propelled machines. A tether cord is wound in loop formation about control stakes in the center of a field. The free end of the cord is connected to a self-propelled mowing machine for guiding the machine in generally spiral path about a flat base as it unwinds the cord from the spaced winding stakes.

Ramer, U.S. Pat. No. 3,273,664, describes a remote automatic control for a power driven tractor. This control has a movable dolly which is fixedly positionable at various specific locations. A round take-up spool is mounted on the dolly for taking-up or pay-out tether cords to control a spiral path. A dual tether cord arrangement has a main cord connected to one side of a steering rod and a spring-loaded counter part connected to the other side of the steering rod for keeping the wheels of the tractor in a slight outward cant by said spring force.

Jensen, U.S. Pat. No. 3,744,223, describes a tether apparatus for controlling the path of a self-propelled lawn mower in a closing or decreasing spiral path. A round take-up spool is staked to the ground and the self-propelled mower is guided inwardly as the tether cord is wound upon the spool, thereby automatically drawing in the mower to the point of anchorage of the spool. A trip rod shuts off the mower as it reaches the take-up spool.

Goodwin, U.S. Pat. No. 3,853,069, describes a steering apparatus for a wheeled vehicle whereby a follower wheel is caused to travel in a rectangular guideway. This follower wheel is connected through a follower bar to control the operation of the vehicle steering assembly.

The prior art tether-control devices control the "shape" of the tractor path with the "shape" of the take-up spool. Primarily, the paths are spirals, i.e., closing "circles" because the take-up spools are round. Haupt, who uses an elongate "stake" take-up arrangement, also describes an essentially spiral path, i.e. closing/expanding circular paths.

However, as most fields or areas to be plowed or mowed are rectangular, it is desirable to provide a control apparatus which will allow for an elongate or oval or rectangular path rather than a circular one.

What is desired is a control apparatus for controlling the operation of a self-propelled tractor in a rectangular field.

An object of this invention is to provide a tether control for a self-propelled tractor including a take-up or pay-out spool to control the operation of the tractor to travel elongate paths.

A second object of this invention is to provide an elongate guideway upon which said take-up spool operates, the combined operation of said take-up spool and its movement along said guideway acting to control the "shape" of the tractor path.

A further object of this invention is to control the take-up operation of the tether cable to conform to and control a specific tractor "width".

Another object of this invention is to provide a permanent guideway which is buried in a field or a lawn and is out of sight.

Another object of this invention is to provide a trolley upon which said take-up spool rides, said trolley along and being removable from the guideway.

An even further object of this invention is to provide the tractor with a steering control tied to and operated by the tether cable connection.

SUMMARY OF THE INVENTION

The objects of this invention are realized in an automatic control apparatus for controlling the operation of a self-propelled slave tractor with the use of a tether control cable, this cable being taken-up and payed-out from a round spool which is mounted for movement on a wheeled trolley.

The trolley operates along a guideway and is caused to roll freely therealong by a pull on the tether cable exerted because of the movement of the tractor parallel to the guideway. The length and shape of the guideway determines the shape of the area of the field covered by the tractor. Typically, when the guideway is a long straight track, the area travelled by the tractor will be an elongate oval created by a closing oval spiral path.

The guideway can be implemented by a buried track having opposed channels in which the four wheels ride for supporting the trolley. A stop is established at both ends of the track which causes the trolley to halt. The tractor is caused to turn and cable is taken up while the trolley is in the stopped position at either end of the track.

With larger tractors, where the strength of the tether cable, spool and trolley is not sufficient to cause the tractor to turn, a steering control is positioned on the tractor and operated by the tether cable connection.

DESCRIPTION OF THE DRAWINGS

The advantages, features and operation of the invention will better be understood from a reading of the following specification in connection with the accompanying drawings in which like numerals refer to like elements and in which.

DETAILED DESCRIPTION OF THE INVENTION

Figure 1:
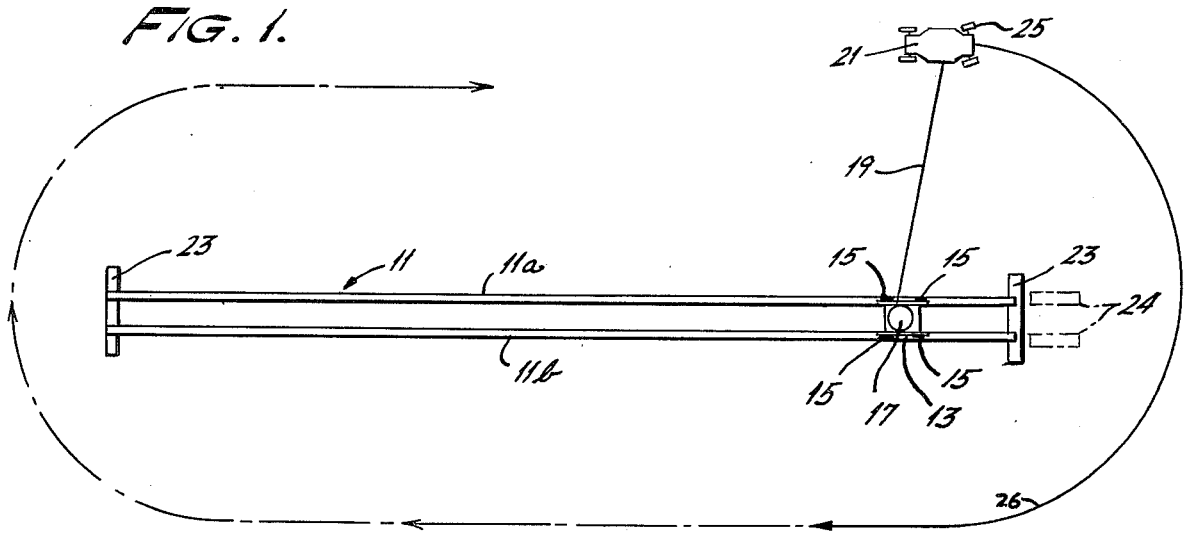
FIG. 1 is a plan view of the invention showing the buried track with the take-up spool trolley riding thereon and a self-propelled tractor controlled by the operation of a tether cable.

A guideway control apparatus for automatically controlling the steering operation of a non-track, self-propelled slave tractor incorporates a length of track 11, FIG. 1. This track has two rails 11a and 11b which extend parallel to one another and provide the guideway on which a trolley 13 rides, supported by four wheels 15. A spool 17 is mounted on top of the trolley 13 for either taking up or paying out a tether cable.

Attached to the end of the tether cable 19 is a self-propelled slave tractor, such as a self-propelled lawn mower 21. Each end of the track 11 is closed off by a stop member 23. An optional extension section 24 can be utilized for mounting the trolley 13 onto the track 11.

The track 11, as shown in FIG. 1, can be a straight length of track. In this instance, the area covered by the self-propelled tractor mower 21 is an elongate oval approximating a rectangle whereby passes of the tractor 21 close upon themselves, as an example, in concentric decreasing diameter ovals. The trolley 13 is free to roll along the track 11, and as the self-propelled tractor 21 travels parallel to the track 11, it pulls the trolley 13 along with it down the length of the track 11. The front wheels 25 of the tractor mower 21 may be canted outwardly slightly or cable attached closer to the rear to establish an outward force vector to enable the mower 21 to travel in a straight line and counteract the slight pull on the tether cable 19 caused by the friction of the trolley wheels 15 travelling along the track 11.

When the tractor mower 21 has reached the end of the field and the trolley 13, which has been pulled along reaches the stop 23, the tether cable 19 draws against the mower 21 and causes it to travel in a curved or arc-like path 26. As the tractor mower 21 makes the curved arc 26, a length of the cable 19 is drawn up onto the spool 17 drawing the tractor 21 closer to the track 11 for its return travel. This operation is continued over and over to cause the tractor 21 to automatically travel around a rectangular field as an elongate oval spiral. When the cable 19 has been completely wrapped around the spool 17, the final path of the tractor 21 will be adjacent to the track 11. Once this is accomplished, the tractor 21 can be shut off and the tether cable disconnected. The trolley 13 is removable from track 11 when the control apparatus is not in operation by moving the stop 23 and passing the trolley into the extension section 24 where it can be withdrawn.

Figure 2:
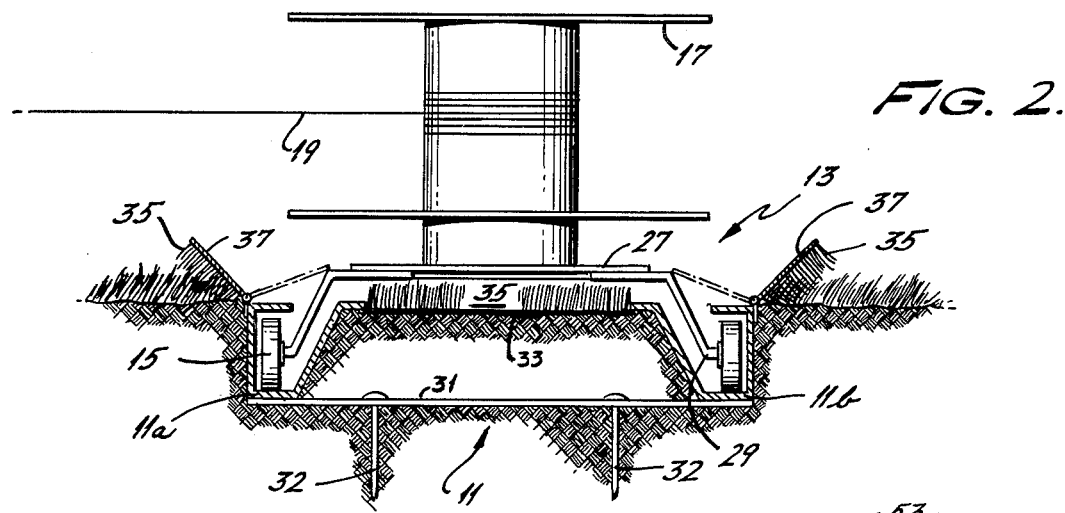
FIG. 2 shows an end view of the trolley of FIG. 1 with the take-up spool mounted thereon from which the tether cable extends and a cross-sectional view of the guideway track on which the trolley rides.

FIG. 2 shows an end view of the trolley 13 and cross section of the track 11. This trolley 13 has a square plate 27 as the base and main support for the spool 17 around which the tether cable 19 is wound. This square base plate 27 is made of a rigid material such as aluminum or steel. Four "Z"-shaped axles 29 are welded, brazed or otherwise attached to each of the four corners of the base plate 27 to make the trolley 13 and a wheel 15 mounted for rotation on the end of each axle 29.

The trolley 13 rides in the track 11 which has been buried below grade in a rectangular excavation. The track 11 has a plurality of spacers 31 which extends the width of the track 11. These spacers 31 are secured to the ground by a plurality of spaced spikes 32. The rails 11a and 11b, which form the track 11, are connected to the spacers 31 to run longitudinally along the spacers 31 on either edge. Each of these rails 11a, 11b has a "C"-shaped cross section, the rails being positioned to have these sections face one another, and open horizontally, and an elevated lip rising off of the bottom web of each "C". This elevated lip extends inwardly toward the center of the track 11 to a central, longitudinally running cover plate 33 which has an artificial grass surface 35 mounted on the top side thereof. A pair of longitudinally running hinged cover plates 37 are mounted to the edge of the top web of each "C" of each rail 11a, 11b. These hinged cover plates 37 can be closed to protect the interior portion of each rail 11a, 11b from dirt and debris when the trolley 13 is not running along the track. The hinged cover plates 37 also have an artificial grass covering 35 which will camouflage the track 11 when not in use.

The trolley 13 wheels 15 ride deep within the "C" portions of each of the rails 11a, 11b, thereby holding the trolley 13 within tracks 11 and keeping it from being pulled out by tension on the tether cable 19 exerted by the self-propelled tractor mower 21.

The roller type wheels 15, FIG. 2, exert a force, primarily, on the bottom and top webs of the "C" portion of each of the rails 11a, 11b. A tension on the tether cable 19 will cause the trolley 13 to tip slightly and to pull slightly to one side of the track 11, causing one of the wheels 15 to ride more deeply within the respective "C" portion of its respective rail. The design allows for a rather shallow excavation and a rather simple extrusion for the track 11 which can be made of long sections of extruded aluminum or rolled steel.

Figure 3:
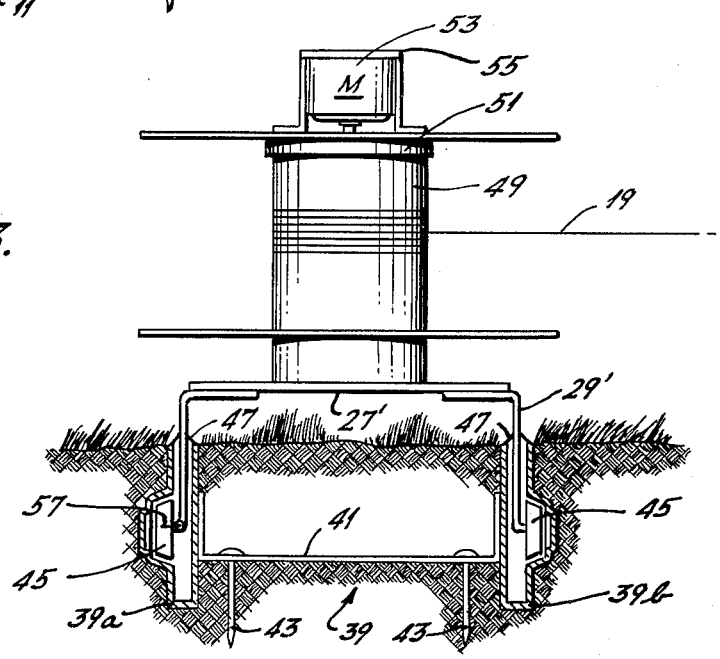
FIG. 3 shows an end view of an alternate embodiment for the trolley and track of FIG. 2, where the spool is mobilized and the track has a compact configuration.

An alternate embodiment for the track 11 of FIG. 1 is shown in FIG. 3. Here, each of the rails 39a, 39b of the track 39 are built as individual extrusions which are separately and individually buried in the ground below grade and are held together by cross braces 41. Each cross brace 41 is secured in position by a plurality of spikes 43.

Each of the rails 39a, 39b can be made of an extruded aluminum or rolled steel and a long "C"-shaped cross section which opens vertically, and has two stepped "C" cross sectional portions in the outer side web. A bevel-shaped roller wheel 45 operates within these outer side "C" portions.

The trolley 15' of this embodiment has the square base plate 27' to which the four "Z"-shaped axles 29' are connected. These four axles 29', however, unlike the first embodiment's axles 29 (which have 45° bends), have 90° bends so that they provide a narrower but higher profile for the structure. A rubber or plastic dirt guard 47 is comprised of two lips which overlap one another to cover the open upper side of the rails 39a, 39b, thereby preventing dirt and other debris from dropping into the hollow interior of each of these rails 39a, 39b. The axles 29' pass through and spread the dirt guard 47 as the trolley 15' travels along the length of the track 39. A round spool 49 is mounted on top of the square plate 27'. This spool 49 takes up the tether cable 19, but differs from the spool 17 of the first embodiment in that this spool 49 can be selectively rotated. A ratchet type transmission 51 is driven by an electric motor 53 which is mounted on top of the spool 49 to rotate the drum portion of the spool 49 when the motor 53 is activated.

This latter embodiment, FIG. 3, with the narrow profile of the rails 39a, 39b and cross brace 41 structure allows the space between the individual rails 39a, 39b to be filled with dirt in which natural grass will grow and thereby eliminates the need for the cover plate 33. The narrow profile of each of the rails 39a, 39b also eliminates the need for the hinged cover plates 37 used in the first embodiment, FIG. 2. Moreover, with the spool 17, it is the diameter of the drum portion of the spool 17 which determines the length of the tether cable 19 which is taken in as the tractor mower 21 travels the arc path 26. Naturally, as more of the tether cable 19 is wound upon the drum portion of the spool 17, the larger will be the effective diameter of the spool 17. This will cause an ever-increasing drawing in of the tether cable 19 as the mower 21 is spiralled inwardly along its elongate or oval path. It is preferred that the drum of the spool 17 be sized so that a length of cable 19 less than a full cut is drawn in when an arc path 26 is traversed at the outer edges of a field, while a full cut is obtained at the inner portion of the field adjacent the track 11.

Moreover, as the diameter of the drum portion of the spool 17 sets the effective range of the width of cut for each tractor mower 21 which is capable of being used with that particular spool 17, with wider cut mowers 21, a larger diameter spool 17 is substituted and mounted on the trolley 15 than with smaller cut mowers 21.

An electrical control 55 can be set by the operator, FIG. 3, for determining the amount of rotation of the motor 53 in order to control the amount of takeup of the tether cable 19 at each end of the track 39 when the tractor mower 21 is traversing the arc path 26 to cause an inward movement for the next pass. When the motor 53 is a digital stepping motor, the electrical control 55 can be digital drive circuitry which controls the amount of rotation of the spool 49 which, when coordinated with the natural arc path 26 travel of the mower 21, results in a predetermined amount of tether cable 19 taken up on the spool 49. This variable control 55 can be adjusted to handle a number of different size mowers 21 with the same spool 49. Moreover, the control circuitry 55 can modify the degree of rotation of the spool 49 as the cable builds up on the spool 49 whereof the effective diameter of the spool 49 changes and thereby eliminates the considerations of the first spool 17.

Figure 4A:
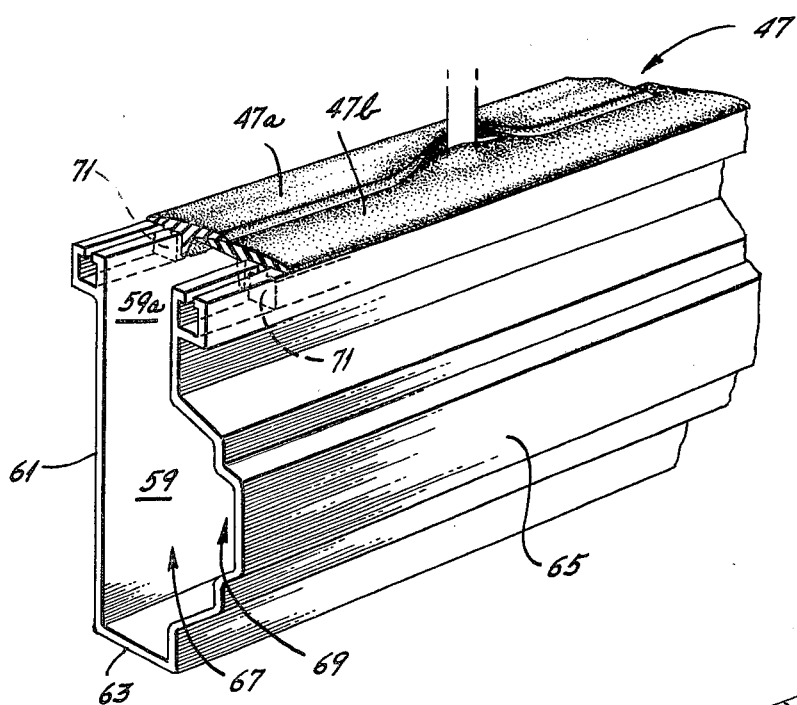
FIG. 4(a) shows a perspective view of a typical section of the track, including the debris guard operation for the embodiment of FIG. 3.

As shown in FIG. 4a, each of the tracks (39a, 39b) can be made of a hollow extruded aluminum section or a rolled steel section which is buried in the ground. Each rail 39a, 39b has a main portion 59 which is essentially U-shaped with an open upper end 59a having a first straight side 61 and a straight bottom 63 which extends orthogonally to the first straight side 61. The side 65 opposite the first straight side 61 has a series of steps in it forming two "C"-shaped sections which have slightly angled or beveled walls. The first of these beveled "C" sections 67 has larger dimensions than the second of these beveled sections 69. The dimensions of the larger beveled section 67 are such that the beveled roller wheels 45 ride within this section within close tolerances whereof the smaller beveled "C" section 69 provides an opening clearance for the end of the axle 29' on which the beveled wheel 45 rides.

The dirt guard 47 has two overlapping lips 47a, 47b which are parted as an axle 29' travels along the rail 39a, 39b. These dirt guard lips 47a, 47b are held by small "C"-shaped ledges 71 at the open upper end 59a of each of the walls 61, 65. While these dirt guard lips 47a, 47b have been previously described as being made of rubber or plastic, any other weatherproof pliable material may be substituted.

Figure 4B:
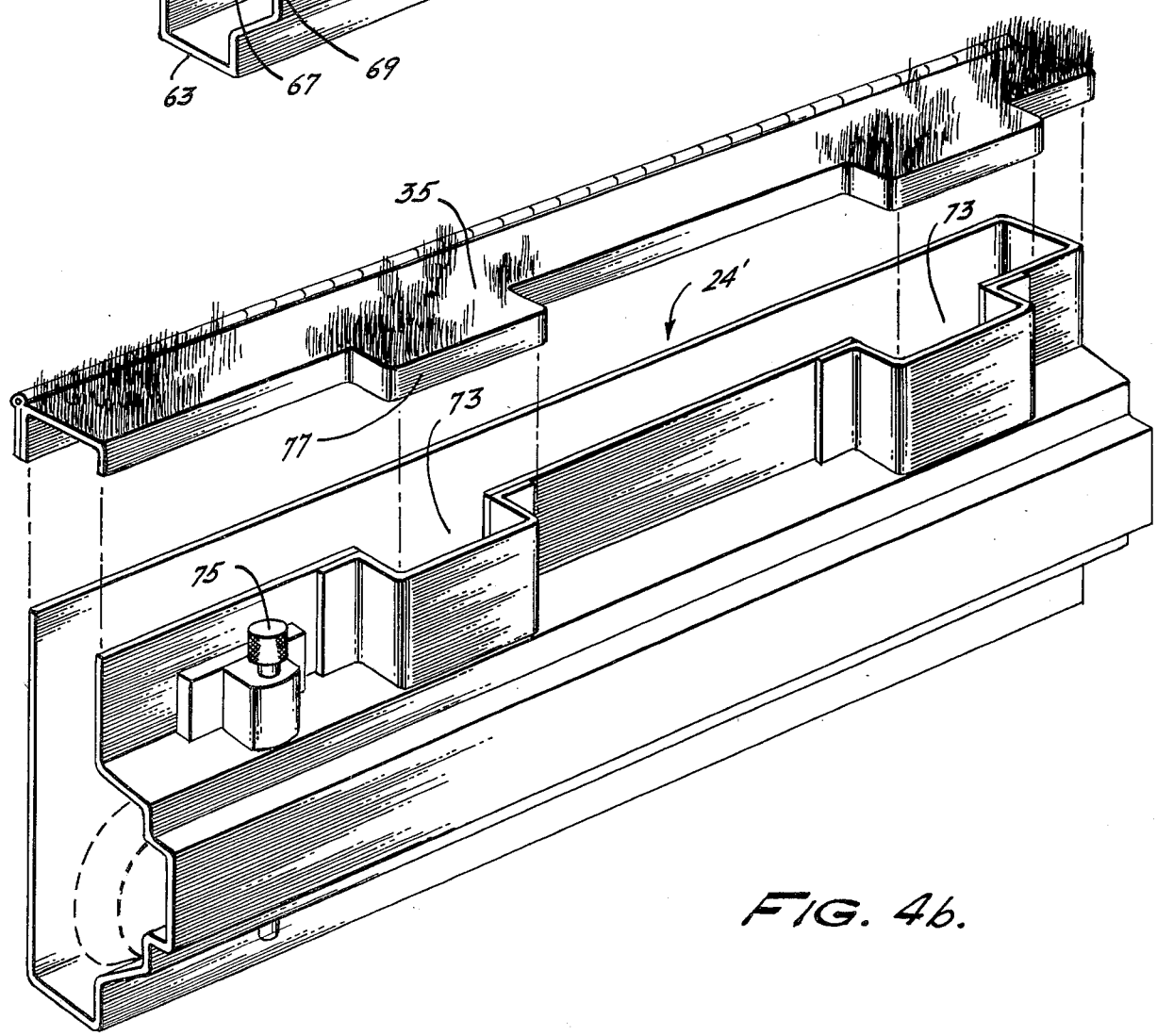
FIG. 4(b) shows an exploded perspective view of the end section of the track of FIG. 4(a) beyond the stop point, at which location the trolley axle and wheels of the embodiment of FIG. 3 are insertable and removable from the enclosed track.

Corresponding to the end section 24 of FIG. 1, a trolley insert section 24' for the track 39 of FIG. 3 is shown in detail in FIG. 4b. This insert section 24' is made identically to the track section of FIG. 4a except for a pair of extended insert openings 73 for receiving each of the wheels 45 and axles 29' into the riding portion, i.e., the larger beveled "C" section 67 of the structure. A stop pin 75 is removable to allow the trolley to roll into the working section of the track 39. This stop pin 75 extends vertically downwardly through the middle of the larger beveled "C" section 67 to cause a physical block for the front running wheel 45. The trolley insert section 24' has a cover 77 which is hinged and includes artificial grass 35' covering on its outer side. This cover 77 is used to protect the trolley insert section 24' from dirt and debris and to close it over to blend with the terrain when the trolley 15' is not being used.

Figure 5:
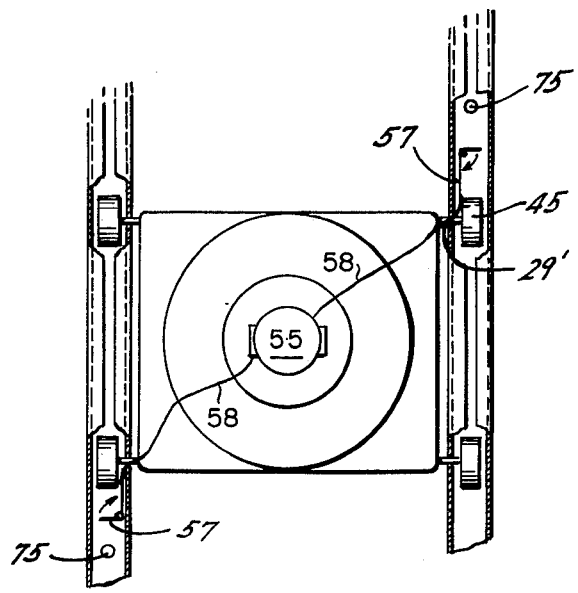
FIG. 5 shows a plan view of the embodiment of FIG. 3 showing the stop microswitches.

FIG. 5 shows a top plan view of the alternate embodiment of FIG. 3 wherein the microswitch 57, which is electrically wired 58 to the electrical control 55, extends beyond the leading axle 29' and operates completely within the larger beveled "C" section 67 to trip upon the stop pin 75 prior to the wheel 45 contacting the stop pin 75. The tripping of this microswitch 57 activates the electrical control 55 for operating the rotation of the motor 53 through the transmission 51.

Figure 6:
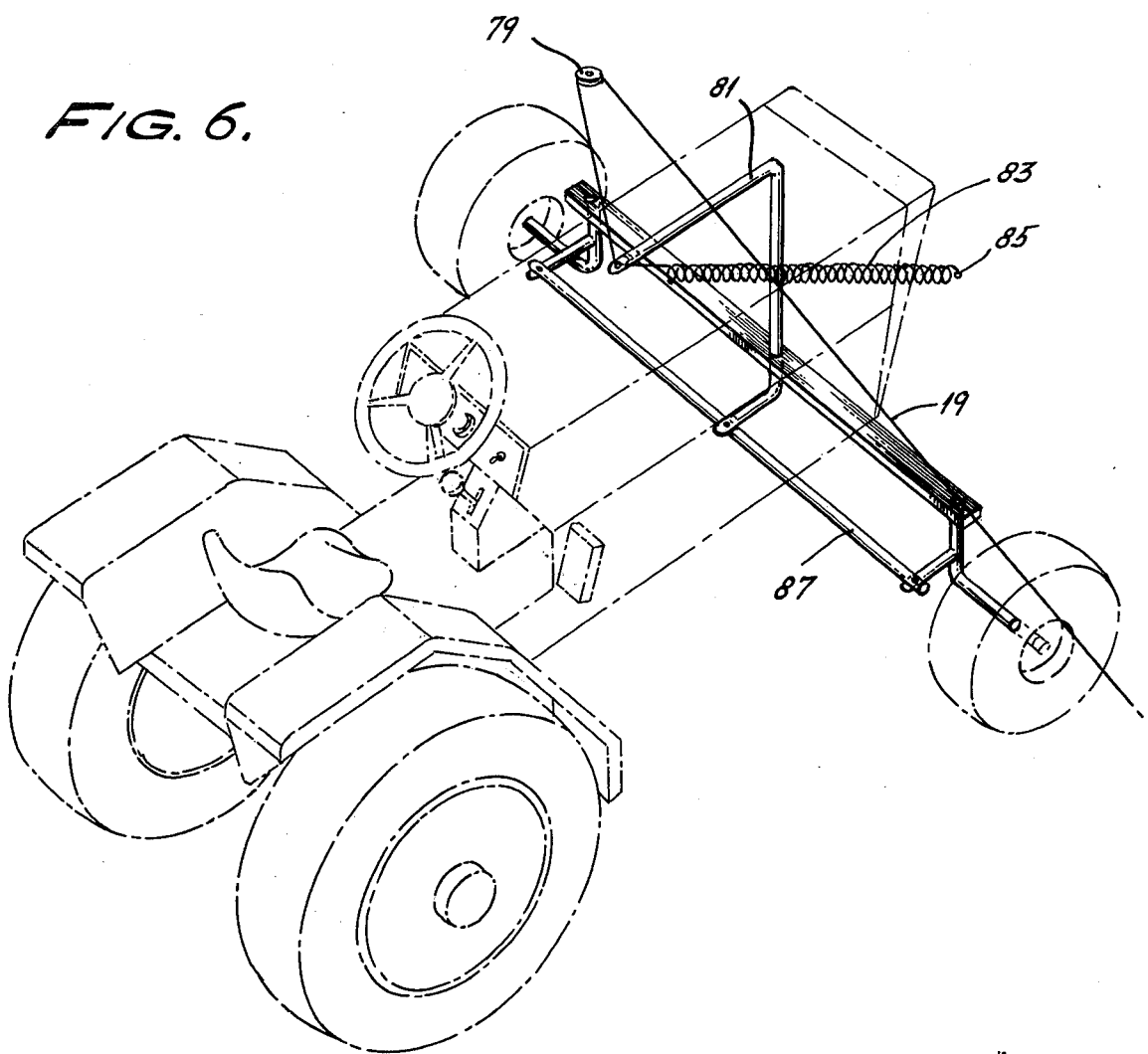
FIG. 6 shows a perspective view of the steering control connection of the tether cable to a large self-propelled tractor.

When a small tractor mower 21 is controlled by the invention, the physical structure of the trolley 15' and tether cable 19 is sufficient to drag or otherwise control the tractor mower 21 through an arc path 26 turn. However, when the invention is used to control the operation of a very large field tractor, the strength of the device is not sufficient to cause such a tractor to turn. When used with field tractors, a steering control connection is incorporated as shown in FIG. 6. The tether cable 19 is connected through a pulley 79 extended on the far side of the tractor to a connection to a steering bar 81 on the tractor. The pull on this tether line 19 is counterbalanced with a spring 83 connected to an extended spring point 85. The steering bar 81 is connected to the tie rod 87 of the tractor which causes the wheels of the tractor to turn.

Many modifications can be made in the above-described invention without departing from the intent and scope thereof. These modifications are a natural extension of, and encompass the basic principles described hereinabove. It is, therefore, intended that the above disclosure is taken as illustrative and is not to be considered in the limiting sense.

What is claimed is:

1. A control apparatus for guiding a self-propelled tractor, comprising:
    a longitudinal guideway positioned on the ground;
    a tether cable connected to said self-propelled tractor;
    means for feeding cable by gathering and paying out said tether cable, said cable feeding means being connected to said tether cable;
    means for holding said cable feeding means for traveling along said guideway; and
    means for stopping said holding means at each end of said guideway for initiating a reversal in direction.

2. The apparatus of claim 1 wherein said guideway is a length of track and wherein said holding means is a trolley riding on said track.

3. The apparatus of claim 2 wherein said cable feeding means is a spool mounted on said trolley, said tether cable being wrappable around said spool.

4. A control apparatus for guiding a self-propelled tractor, comprising:
- a longitudinal length of track positioned on the ground having hollow rails;
- a tether cable connected to said self-propelled tractor;
- a spool gathering and paying out said tether cable and being connected thereto;
- a trolley riding on said track holding said spool, said spool being mounted on said trolley, said tether cable being wrappable around said spool, wherein said trolley includes axles and wheels, said trolley wheels operating within said rail hollow portion and held therein; and
- means for stopping said trolley at each end of said guideway.

5. The apparatus of claim 4 wherein said track rails are buried below grade.

6. The apparatus of claim 5 also including a debris guard over said track hollow portion.

7. The apparatus of claim 6 wherein said track includes a trolley insert section in each rail beyond one of said stopping means.

8. The apparatus of claim 7 wherein said stopping means includes a removable pin through said track hollow portion at each end of said rail which intercepts the travel of one of said wheels.

9. The apparatus of claim 8 wherein each said rail includes an elongated U-shaped section opening vertically, said section having a first straight side and a straight bottom and a double stepped side opposite said first straight side forming a first larger side wall "C"-shaped section and a second smaller side wall "C"-shaped section, wherein said trolley wheel operates within said first larger side wall "C"-shaped section; wherein said trolley also includes a base plate upon which said spool is mounted; said wheel axles being mounted on said base plate; wherein said apparatus also includes a brace extending between said rails and spikes holding said brace to said ground, an electric motor connected to rotate said spool, an electrical control connected to said motor, a microswitch positioned on an axle to intercept a stop pin prior to said wheel intercepting said stop pin, and an electrical wire connection between said microswitch and said electrical motor control.

10. The apparatus of claim 9 also including a steering connection on said self-propelled tractor including:
- a steering bar connected to the steering tie rod of said tractor;
- a pulley mounted on said tractor;
- a spring connected between another point on said tractor and said steering bar, said other point being on the other side of said tractor from said pulley mounting; and
- wherein said tether cable and said spring are connected to said steering bar at the same location.

* * * * *